United States Patent
Hadler-Jacobsen

(10) Patent No.: US 9,911,564 B2
(45) Date of Patent: Mar. 6, 2018

(54) PRESSURE-COMPENSATED FUSE ASSEMBLY

(71) Applicant: ONESUBSEA IP UK LIMITED, London (GB)

(72) Inventor: Aage Hadler-Jacobsen, Nesttun (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 15/186,861

(22) Filed: Jun. 20, 2016

(65) Prior Publication Data

US 2017/0365433 A1    Dec. 21, 2017

(51) Int. Cl.

| | |
|---|---|
| *H01H 85/18* | (2006.01) |
| *H01H 85/40* | (2006.01) |
| *H01H 85/00* | (2006.01) |
| *H01H 85/02* | (2006.01) |
| *H01H 9/02* | (2006.01) |
| *H01H 85/175* | (2006.01) |

(52) U.S. Cl.
CPC ............ *H01H 85/003* (2013.01); *H01H 9/02* (2013.01); *H01H 85/0021* (2013.01); *H01H 85/0026* (2013.01); *H01H 85/0241* (2013.01); *H01H 85/175* (2013.01); *H01H 85/18* (2013.01); *H01H 85/40* (2013.01)

(58) Field of Classification Search
CPC ........... H01H 85/0021; H01H 85/0026; H01H 85/0241; H01H 85/40; H01H 9/02; H01H 85/175; H01H 85/003; H01H 85/18
USPC ............................................. 337/1, 187, 204
See application file for complete search history.

(56) References Cited

U.S. PATENT DOCUMENTS

| | | | | | |
|---|---|---|---|---|---|
| 1,562,984 | A | * | 11/1925 | Murray .............. | H01H 85/0456 337/237 |
| 1,829,604 | A | * | 10/1931 | Friedrich ............... | H01H 85/40 337/277 |
| 2,247,084 | A | * | 6/1941 | Goff ..................... | H01H 85/044 337/248 |
| 2,681,398 | A | * | 6/1954 | Kozacka .............. | H01H 85/044 174/50.52 |
| 2,866,875 | A | * | 12/1958 | Swain ................ | H01H 85/0456 337/158 |
| 3,132,226 | A | * | 5/1964 | Bennett .................. | H01H 9/102 218/107 |
| 3,291,926 | A | * | 12/1966 | Nelson ................... | H01H 9/085 200/302.1 |
| 3,522,570 | A | * | 8/1970 | Wanaselja .............. | H01H 85/44 337/28 |

(Continued)

FOREIGN PATENT DOCUMENTS

| | | | | |
|---|---|---|---|---|
| DE | 3248080 A1 | * | 6/1984 | ............. H01F 27/14 |
| EP | 2495746 A1 | | 9/2012 | |
| EP | 2838104 A1 | | 2/2015 | |

*Primary Examiner* — Anatoly Vortman
(74) *Attorney, Agent, or Firm* — Fletcher Yoder, P.C.

(57) ABSTRACT

A pressure-compensated fuse assembly may include a first chamber housing a first fluid and a plurality of solid particles. Additionally, the fuse assembly may include a second chamber housing a second fluid. Further, the fuse assembly may include a pressure compensator disposed between the first chamber and the second chamber. The pressure compensator may be configured to transfer pressure from the second fluid in the second chamber to the plurality of solid particles in the first chamber.

28 Claims, 6 Drawing Sheets

(56) References Cited

U.S. PATENT DOCUMENTS

| | | | | |
|---|---|---|---|---|
| 3,604,873 | A * | 9/1971 | Boliver | H01H 33/021 218/97 |
| 3,662,309 | A * | 5/1972 | Harmon | H01H 85/54 337/202 |
| 3,681,731 | A * | 8/1972 | Kozacka | H01H 85/055 337/166 |
| 3,723,930 | A * | 3/1973 | Koch | H01H 85/044 337/158 |
| 3,848,215 | A * | 11/1974 | Kozacka | H01H 85/165 337/186 |
| 3,878,314 | A * | 4/1975 | Link | G02B 6/4451 174/17 LF |
| 4,012,708 | A * | 3/1977 | Goe, Jr. | H01F 27/402 337/205 |
| 4,028,656 | A * | 6/1977 | Schmunk | H01H 69/02 174/179 |
| 4,083,028 | A * | 4/1978 | Haubein | H01H 85/46 200/333 |
| 4,135,174 | A * | 1/1979 | Biller | H01H 85/143 337/186 |
| 4,136,339 | A * | 1/1979 | Kuhn | H01H 85/2045 337/224 |
| 4,208,787 | A * | 6/1980 | Luck | H01H 69/02 29/623 |
| 4,743,996 | A * | 5/1988 | Book | H01H 85/44 337/31 |
| D315,894 | S * | 4/1991 | Giannini | D13/171 |
| 5,103,203 | A * | 4/1992 | Huber | H01H 85/157 337/205 |
| 5,270,679 | A * | 12/1993 | Gulbrandsen | H01H 85/153 29/623 |
| 5,977,498 | A * | 11/1999 | Levine | H01H 9/04 200/11 R |
| 7,808,362 | B2 * | 10/2010 | Stanek | H01H 85/0013 337/186 |
| 8,212,646 | B2 * | 7/2012 | Crane | H01H 9/44 337/273 |
| 8,292,109 | B2 * | 10/2012 | Lauk | F16H 57/027 215/307 |
| 8,427,807 | B2 * | 4/2013 | Bo | H01G 2/10 361/272 |
| 9,035,739 | B2 * | 5/2015 | Boe | H01H 85/0021 337/186 |
| 9,508,517 | B2 * | 11/2016 | Breili | H01H 85/0021 |
| 2008/0212268 | A1 * | 9/2008 | Janisch | H05K 5/068 361/724 |
| 2009/0226262 | A1 * | 9/2009 | Karstad | B63G 8/08 405/191 |
| 2013/0286549 | A1 * | 10/2013 | Hazel | H02B 7/00 361/624 |
| 2014/0055227 | A1 * | 2/2014 | Boe | H01H 85/0021 337/1 |
| 2014/0374132 | A1 * | 12/2014 | Boe | H01H 85/0013 174/50.51 |

* cited by examiner

PRESSURE-COMPENSATED FUSE ASSEMBLY

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are a common source of fuel for a variety of applications. For example, oil and gas are often used to heat homes, to power vehicles, and to generate electrical power. Drilling and production systems are typically employed to access, extract, and otherwise harvest desired natural resources, such as oil and gas, that are located below the surface of the earth. These systems may be located onshore or offshore depending on the location of the desired natural resource. When a natural resource is located offshore (e.g., below a body of water), a subsea production system may be used to extract the natural resource. Such subsea production systems may include components located on a surface vessel, such as a rig or platform, as well as components located remotely from the surface vessel at a subsea location, typically at or near a subterranean formation (e.g., a well) at which the resource is located. For example, a subsea production system may include one or more subsea wellhead assemblies and Christmas trees for controlling the flow of a natural resource into or out of a well.

Additionally, a subsea production system may include one or more electrical components, such as pumps, motors, compressors, for example. For instance, the innate pressure within a well may decrease as a natural resource is extracted from the well over time, and a subsea pump may be used to facilitate the extraction of the natural resource from the well. The subsea production system may include a subsea power grid to provide power to the various electrical components of the subsea production system. To protect the electrical components from over-currents, the subsea production system may include fuses, which interrupt an electrical connection if the current flowing through the fuse is too high. Conventional fuses (e.g., surface or topside fuses) are designed to operate at a pressure of about one atmosphere (atm). To utilize conventional fuses for subsea applications, the fuses may be placed in one atm pressure vessels. The fuse vessels may be exposed to high pressures at subsea locations. Thus, the fuse vessels typically include thick walls to withstand the high pressures, which may increase the size, weight, and cost of the fuse vessels.

BRIEF DESCRIPTION

The present disclosure describes a pressure-compensated fuse assembly, comprising a first chamber housing a first fluid and a plurality of solid particles; a second chamber housing a second fluid; and a pressure compensator disposed between the first chamber and the second chamber. The pressure compensator is configured to transfer pressure from the second fluid in the second chamber to the plurality of solid particles in the first chamber.

According to some embodiments, the present disclosure describes a fuse system comprising an inner housing with a first chamber containing a first fluid and a plurality of solid particles; an outer housing disposed around the inner housing, the outer housing comprising a second chamber containing a second fluid; and a piston disposed between the first chamber and the second chamber, the piston being configured to transfer pressure from the second fluid in the second chamber to the plurality of solid particles in the first chamber.

According to some embodiments, the present disclosure describes a subsea mineral extraction system, comprising a pressure-compensated fuse assembly configured to be disposed in a subsea location. The pressure-compensated fuse assembly comprises an outer housing; an inner housing disposed within the outer housing. The inner housing comprises a first chamber having a first fluid; a sleeve disposed circumferentially around the first chamber; and a piston disposed within the sleeve, the piston being configured to translate relative to the sleeve; and a second chamber having a second fluid, the second chamber being disposed in the outer housing, and the piston being disposed between the first chamber and the second chamber.

According to some embodiments, the present disclosure describes a system, comprising a pressure-compensated fuse assembly. The pressure-compensated fuse assembly comprises a first chamber containing a gas and a plurality of solid particles; a sleeve disposed around the first chamber; a second chamber containing a dielectric fluid; a piston disposed within the sleeve and between the first chamber and the second chamber, the piston being configured to translate relative to the sleeve; and a flexible metal seal coupling the piston to the sleeve, the flexible metal seal being configured to seal off an annulus between the piston and the sleeve to separate the gas and the plurality of solid particles in the first chamber from the dielectric fluid in the second chamber.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION

Figure 1:
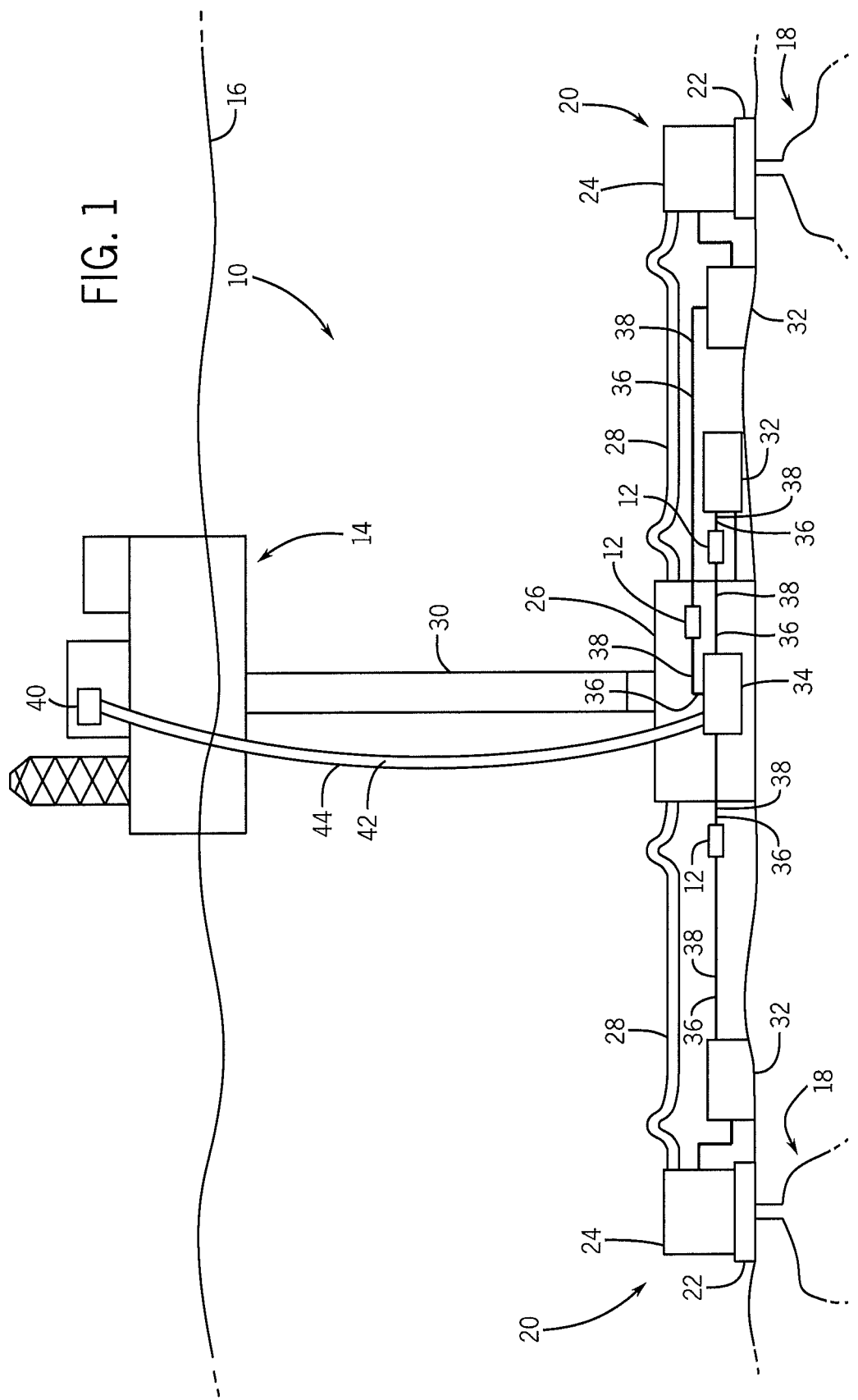
FIG. 1 is a schematic view of an embodiment of a mineral extraction system with a pressure-compensated fuse assembly.

One or more specific embodiments of the present disclosure will be described below. These described embodiments are only exemplary of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "comprising," "including," and "having" are used in an open-ended fashion, and thus should be interpreted to mean "including, but not limited to . . . ". Any use of any form of the terms "connect," "engage," "couple," "attach," "mate," "mount," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

As discussed below, a variety of systems may include fuses to block or protect electrical components from over-currents. In some systems, fuses may be exposed to high pressures, such as pressures above about one atmosphere (atm). For example, a subsea production system may include electrical components and fuses at subsea locations at pressures greater than or equal to approximately 10, 50, 100, 200, 300, 400, 500, 600, 700, 800, 900, or 1000 atm. Conventional fuses (e.g., surface or topside fuses) are typically configured to operate at a pressure of about one atm. To utilize conventional fuses in high pressure environments, the fuses may be disposed in vessel filled with a gas, such as air, at a pressure of about one atm. However, to withstand the high pressures, the gas-filled vessel typically includes thick walls, which may increase the size, weight, and cost of the fuse. Alternatively, the vessel may be filled with a dielectric fluid, such as oil, at a pressure substantially equal to the pressure surrounding the vessel. The dielectric fluid-filled vessel may enable reduced wall thickness as compared to the gas-filled vessel. However, the dielectric fluid may alter the current-time characteristics of the fuse, and if an arc results from a short circuit in the downstream electrical circuit, the pressure wave from the arc may cause the pressurized, thin walled, vessel to burst and cause secondary damage.

The present disclosure is directed to embodiments of a pressure-compensated fuse assembly configured to be disposed between a first electrical component and a second electrical component to provide over-current and short circuit protection. As discussed below, the pressure-compensated fuse assembly may be used in high pressure environments (e.g., pressures greater than about one atm) while enabling reduced wall thickness as compared to non-pressure compensated fuse assemblies. Further, in some embodiments, the pressure-compensated fuse assembly may be used in high pressure environments without substantially altering one or more operating characteristics of the fuse (e.g., fuse filament), such as the current-time characteristics.

FIG. 1 is a schematic view of an embodiment of a subsea production system 10 (e.g., subsea extraction system) including one or more pressure-compensated fuse assemblies 12. The subsea production system 10 may include a mineral (e.g., oil, gas, and/or hydrocarbon) extraction system located at an offshore location. For example, the subsea production system 10 may include a surface vessel 14, such as a rig or platform, generally located at a surface 16 of the offshore location. The subsea production system 10 may include one or more subterranean formations or wells 18 disposed at a distance or depth below the surface 16.

The subsea production system 10 may be configured to extract subterranean natural resources, such as oil, gas, and/or hydrocarbon, from the one or more wells 18. For example, the subsea production system 10 may also include one or more wellhead systems 20 that couple to the wells 18 to enable extraction of the subterranean natural resources. Each wellhead system 20 may include a wellhead 22 coupled to a production tree 24 (e.g., Christmas tree). In some embodiments, each production tree 24 may be coupled to a common manifold 26 by a jumper 28 (e.g., hose, pipe, tubing, flow line, production outlet, etc.). Production fluids extracted from the wells 18 may flow from the production trees 24 to the common manifold 26 through the jumpers 28. The common manifold 26 may direct the production fluids to the surface vessel 14 through a riser 30.

In some embodiments, the subsea production system 10 may include one or more electrically-powered components 32 (e.g., subsea electrically-powered components, electrical components, power-receiving devices, electrical loads, etc.) located below the surface 16. The one or more electrically-powered components 32 may include any suitable components configured to operate using electrical power, such as pumps, motors, compressors, sensors, controllers, electrically-actuated valves, and the like. For example, in some embodiments, the one or more electrically-powered components 32 may include one or more pumps (e.g., subsea pumps, downhole pumps, mud-line pumps, etc.) configured to facilitate extraction of the subterranean resources from the wells 18 and/or to facilitate the flow of production fluids received at the common manifold 26 to the surface vessel 14.

In certain embodiments, the subsea production system 10 may include a power distribution unit 34 (e.g. a subsea power distribution unit, a transformer, an inverter, an electrical component, etc.) configured to provide power to the one or more electrically-powered components 32 via one or more cables 36 (e.g., power lines, conductors, etc.). As discussed below, in some embodiments, one or more of the cables 36 may be disposed within a jumper 38 (e.g., a hose, a pipe, a flow line, a tube, tubing, etc.) configured to flow a fluid, such as oil. As illustrated, the power distribution unit 34 may is disposed in or on the common manifold 26. However, the power distribution unit 34 may be disposed in any suitable location below the surface 16 or on the surface vessel 14. The power distribution unit 34 may receive power from a power source 40 (e.g. an electrical component), which may be located at the surface 16 (e.g., on the surface vessel 14), via a cable 42 (e.g., an umbilical, a power line, conductor, etc.). In some embodiments, the cable 42 may be disposed within a jumper 44 configured to flow a fluid, such as oil. In some embodiments, the cable 42 may be disposed within the riser 30.

In certain embodiments, the power distribution unit 34 may be configured to process the received power in addition to distributing the received power to the one or more electrically-powered components 32. For example, in some embodiments, the power distribution unit 34 may include a transformer configured to increase and/or decrease the voltage of the received power. Additionally or alternatively, the power distribution unit 34 may include an inverter (e.g. a power inverter) configured to convert direct current (DC) to alternating current (AC). For example, in some embodiments, the power source 40 may be configured to provide DC power, and the one or more electrically-powered components 32 may operate using AC power.

As noted above, the subsea production system 10 includes the one or more pressure-compensated fuse assemblies 12. The pressure-compensated fuse assemblies 12 may be disposed in any suitable location, such as disposed in, on, or external to the electrically-powered components 32, the wellhead systems 20, and/or the manifold 26. The pressure-compensated fuse assemblies 12 may be configured to provide over-current and short circuit protection for electrical components of the subsea production system 10, such as the power distribution unit 34, the electrically-powered components 32, and/or the power source 40. For example, the subsea production system 10 may include one or more pressure-compensated fuse assemblies 12 disposed between the power source 40 and the power distribution unit 34 to block or protect the power distribution unit 34 (as well as the downstream electrical-powered components 32) from over-currents from the power source 40. Additionally or alternatively, the subsea production system 10 may include one or more pressure-compensated fuse assemblies 12 disposed between the power distribution unit 34 and the one or more electrically-powered components 32. In certain embodiments, the subsea production system 10 may include one or more pressure-compensated fuse assemblies 12 disposed between the power distribution unit 34 and each electrically-powered component 32. In this manner, in the event of a fault of an electrically-powered component 32, the pressure-compensated fuse assembly 12 may protect or block the power distribution unit 34 from over-current from the faulty electrically-powered component 32, which may enable continued distribution of power from the power distribution unit 34 to the other electrically-powered components 32.

As illustrated, the pressure-compensated fuse assemblies 12, the jumpers 38, the power distribution unit 34, and the electrically-powered components 32 may be located at a distance or depth from the surface 16. As such, the pressure-compensated fuse assemblies 12, the jumpers 38, the power distribution unit 34, and the electrically-powered components 32 may be exposed to extreme pressures and/or temperatures. For example, in some embodiments, the pressure-compensated fuse assemblies 12, the jumpers 38, the power distribution unit 34, and the electrically-powered components 32 may be exposed to pressures greater than or equal to approximately 10, 50, 100, 200, 300, 400, 500, 600, 700, 800, 900, or 1000 atm. In certain embodiments, the pressure-compensated fuse assemblies 12, the jumpers 38, the power distribution unit 34, and the electrically-powered components 32 may be exposed to temperatures ranging from −45 degrees Celsius (° C.) to +210 ° C., for example. While the illustrated embodiment relates to a subsea production system, it should be noted that the pressure-compensated fuse assemblies 12 may be used in any suitable system, such as any system including a power distribution unit configured to deliver power to one or more electrical components.

Figure 2:
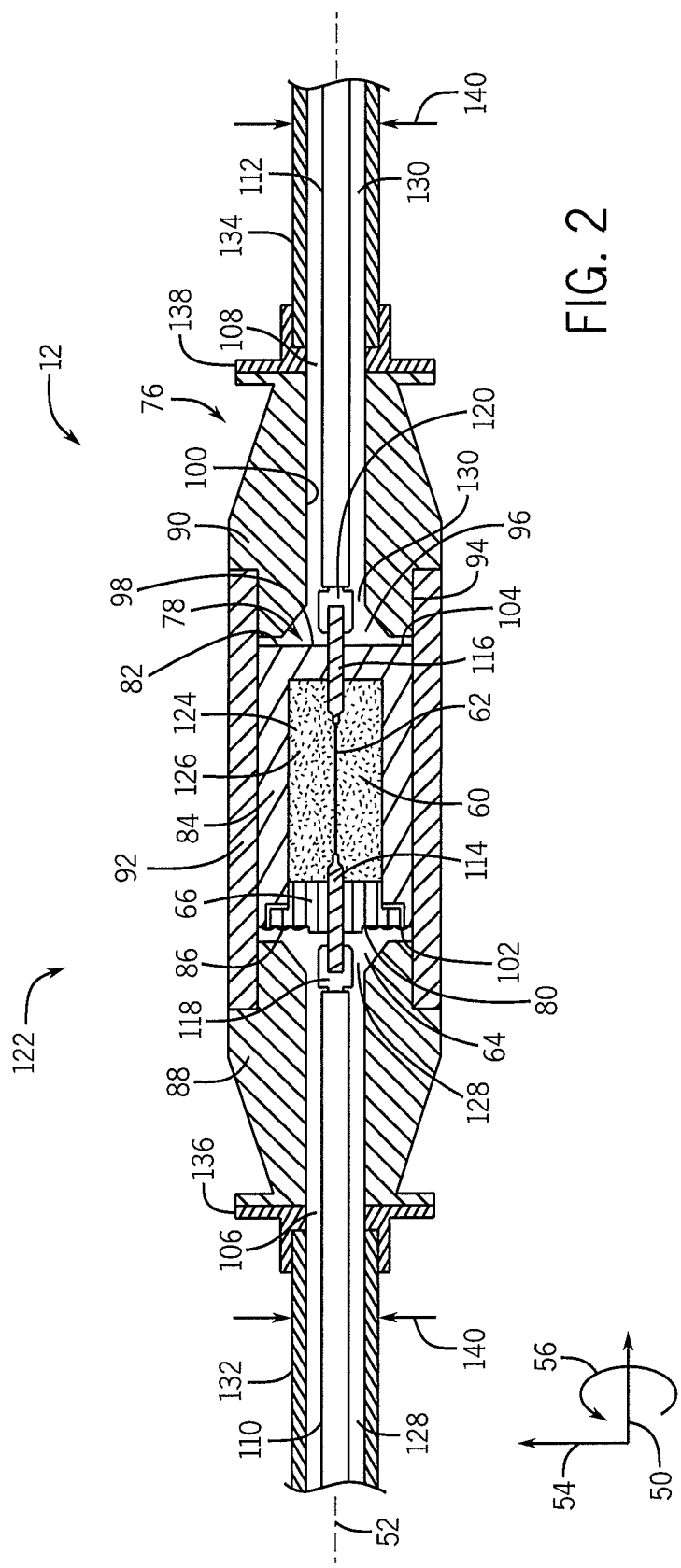
FIG. 2 is a cross-sectional view of an embodiment of a pressure-compensated fuse assembly including a particle-filled chamber and a pressure compensator.

FIG. 2 is a cross-sectional view of an embodiment of the pressure-compensated fuse assembly 12. In the following discussion, reference may be made to various directions or axes, such as an axial direction 50 along a longitudinal axis 52 of the pressure-compensated fuse assembly 12, a radial direction 54 away from the longitudinal axis 52, and a circumferential direction 56 around the longitudinal axis 52. As illustrated, the pressure-compensated fuse assembly 12 may include a first chamber 60, a fuse filament 62 (e.g., a fuse, a fuse element, etc.) disposed in the first chamber 60, a second chamber 64, and a pressure compensator 66 (e.g., a movable structure, a piston, etc.) disposed between the first chamber 60 and the second chamber 64. As described in more detail below, the pressure compensator 66 may enable use of the pressure-compensated fuse assembly 12 in environments at pressures greater than or equal to approximately 1, 5, 10, 50, 100, 200, 300, 400, 500, 600, 700, 800, 900, or 1000 atm, while also enabling reduced wall thickness of the pressure-compensated fuse assembly 12 as compared to fuse assemblies that do not include the pressure compensator 66.

The fuse filament 62 is configured to provide over-current and short circuit protection for the downstream cable and electrical components electrically coupled to the fuse filament 62. In particular, the fuse filament 62 (e.g., a metal wire or strip) is configured to melt if a current passes through the fuse filament 62 that exceeds the rated (e.g., maximum) current for the fuse filament 62, thereby interrupting the electrical circuit between the electrical components coupled to the pressure-compensated fuse assembly 12. The fuse filament 62 may be manufactured with any suitable operating characteristics, such as rated current, current-time characteristics (e.g., the current-time curve, the fuse speed, etc.), breaking capacity, voltage drop, and so forth, based on the design parameters of a system using the pressure-compensated fuse assembly 12. Further, while the illustrated pressure-compensated fuse assembly 12 includes one fuse filament 62, the pressure-compensated fuse assembly 12 may include any number of fuse filaments 62, such as two, three, four, five, or more.

In some embodiments, the fuse filament 62 may be designed to operate at a pressure of approximately (e.g., ±1, 2, 3, 4, 5, 6, 7, 8, 9, or 10%) 1 atm. That is, one or more operating characteristics of the fuse filament 62, such as the current-time characteristics, may be altered (e.g., from ratings provided by a manufacturer of the fuse filament 62) when the fuse filament 62 is used at pressures that are greater than approximately one atm (e.g., greater than approximately 1.1 atm, 1.2 atm, 1.3 atm, 1.4 atm, or 1.5 atm). As discussed below, in some embodiments, the pressure-compensated fuse assembly 12 may be used in environments at pressures greater than approximately 1.1 atm, 1.2 atm, 1.3 atm, 1.4 atm, 1.5 atm, 2 atm, 5 atm, 10 atm, 50 atm, 100 atm, 250 atm, 500 atm, 750 atm, 1000 atm, or greater without substantially altering one or more operating characteristics of the fuse filament 62, such as the current-time characteristics.

As illustrated, the pressure-compensated fuse assembly 12 may include an outer housing 76 and an inner housing 78 (e.g., a fuse housing) disposed in (e.g., surrounded by, contained within, housed within, etc.) the outer housing 76. The first chamber 60 and the fuse filament 62 may be disposed in the inner housing 78. In some embodiments, the inner housing 78 may include a first face 80 (e.g., a base, an end portion, a surface, etc.), a second face 82 opposite from the first face 80, and a sleeve 84 (e.g., a cylindrical sleeve, a cylindrical portion, etc.) extending between the first face 80 and the second face 82. As illustrated, the sleeve 84 (e.g., sleeve wall) may extend about (e.g. circumferentially 56 about) the first chamber 60 and the fuse filament 62.

In certain embodiments, the sleeve 84 may be insulating, high temperature resistant, and/or flame-retardant. For example, the sleeve 84 may be formed from one or more ceramics, glass, one or more thermoset plastics (e.g., polyurethanes, polyesters, epoxy resins, phenolic resins, etc.), one or more thermoplastics (e.g., polyether ether ketone (PEEK), polyvinyl chloride (PVC), polyethylene (PE), polypropylene (PP), etc.), or any combination thereof. Further, in some embodiments, the first face 80 and/or the second face 82 may be formed from one or more materials that are high temperature resistant, flame-retardant, high strength (e.g., high tensile strength, high compressive strength, and/or high shear strength), insulating, and/or conductive. For example, the first face 80 (e.g., the pressure compensator 66) and/or the second face 82 may be formed from one or more ceramics, one or more metallic materials (e.g., metals and/or metal alloys), one or more thermoset plastics (e.g., polyurethanes, polyesters, epoxy resins, phenolic resins, etc.), one or more thermoplastics (e.g., polyether ether ketone (PEEK), polyvinyl chloride (PVC), polyethylene (PE), polypropylene (PP), etc.), or any combination thereof. In some embodiments, the sleeve 84, the first face 80, and/or the second face 82 may be formed from the same materials or different materials.

Additionally, the inner housing 78 may include the pressure compensator 66. For example, the first face 80 of the inner housing 78 may include the pressure compensator 66. In certain embodiments, the second face 82 may include the pressure compensator 66 in addition to or instead of the first face 80. As discussed in more detail below, the pressure compensator 66 may be coupled to (e.g., welded to, bonded to, etc.) the sleeve 84 using one or more seals 86 (e.g., a flexible metal seal, a flexible metal membrane, etc.), while still movable relative to the sleeve 84. In some embodiments, the second face 82 may be integral with the sleeve 84. For example, the second face 82 and the sleeve 84 may be manufactured as a single part, such as by casting the second face 82 and the sleeve 84 using a single mold. In certain embodiments, the second face 82 may be coupled to the sleeve 84. For example, the second face 82 and the sleeve 84 may be coupled using adhesives, welds, brazed joints, mechanically attachments (e.g., bolts, rods, screws, threaded portions, etc.), and/or a friction or interference fit.

In some embodiments, the outer housing 76 may include a first end portion 88 (e.g., an assembly end bell), a second end portion 90 (e.g., an assembly end bell) opposite from the first end portion 88, and a sleeve 92 (e.g., a cylindrical sleeve, a cylindrical portion, etc.) extending between the first and second end portions 88 and 90. The sleeve 92 (e.g., sleeve wall) may extend about (e.g., circumferentially 56 about) the sleeve 84 of the inner housing 78. Further, the sleeve 92 may be disposed adjacent to (e.g., may abut and/or contact) the sleeve 84 of the inner housing 78 when the inner housing 78 is disposed in (e.g., installed in) the outer housing 76. In certain embodiments, the first and second end portions 88 and 90 may each include shoulders 94 (e.g., a pair of shoulders), and the sleeve 92 of the outer housing 76 may be seated in the shoulders 94.

As noted above, the pressure-compensated fuse assembly 12 may be exposed to harsh environmental conditions, such as extreme (e.g., high and/or low) pressures, extreme temperatures, corrosive fluids, and/or abrasive fluids. For example, the pressure-compensated fuse assembly 12 may be exposed to pressures greater than approximately 100 atm, 250 atm, 500 atm, 750 atm, 1000 atm, or greater. To block or protect the pressure-compensated fuse assembly 12 from wear or damage when exposed to such harsh environmental conditions, the outer housing 76 may be formed from one or more materials having high tensile strength, high compressive strength, and/or high shear strength. For example, the first end portion 88, the second end portion 90, and/or the sleeve 92 may be formed from one or more ceramics, one or more metallic materials (e.g., metals and/or metal alloys), or any combination thereof. The first end portion 88, the second end portion 90, and/or the sleeve 92 may be formed from the same materials or different materials. For example, in some embodiments, the first and second end portions 88 and 90 may be formed from a ceramic, and the sleeve 92 may be formed from a metallic material.

The first and second end portions 88 and 90 coupled to the sleeve 92 using any suitable techniques. For example, the first and second end portions 88 and 90 may be coupled to the sleeve 92 using a friction or interference fit, adhesives, welds, mechanical attachments (e.g., bolts, rods, screws, threaded portions, etc.), or any combination thereof. Additionally, in some embodiments, the inner housing 76 (e.g., the sleeve 84 of the inner housing 76) may be configured to form a friction or interference fit with the outer housing 78 (e.g., the sleeve 92 of the outer housing 78). In certain embodiments, the inner housing 76 (e.g., the sleeve 84 of the inner housing 76) may be coupled to the outer housing 78 (e.g., the sleeve 92 of the outer housing 78) using adhesives, welds, brazed joints, mechanical attachments (e.g., bolts, rods, screws, threaded portions, etc.), or any combination thereof.

As noted above, the pressure-compensated fuse assembly 12 includes the second chamber 64. In some embodiments, the pressure-compensated fuse assembly 12 may also include a third chamber 96. The second and third chambers 64 and 96 may be disposed between (e.g., formed or defined by) one or more outer surfaces 98 of the inner housing 78 and one or more inner surfaces 100 of the outer housing 76. As illustrated, the second and third chambers 64 and 96 may be disposed about opposing outer surfaces 98 of the inner housing 78. For example, the second chamber 64 may be disposed between an outer surface 102 of the pressure compensator 66 of the inner housing 78 and the inner surfaces 100 of the outer housing 76 (e.g., inner surfaces of the first end portion 88 and/or the sleeve 92). Additionally, the third chamber 96 may be disposed between an outer surface 104 of the second face 82 of the inner housing 78 and the inner surfaces 100 of the outer housing 76 (e.g., inner surfaces of the second end portion 90 and/or the sleeve 92). In some embodiments, the dimensions and/or geometry of the third chamber 96 may substantially match or mirror (e.g., within manufacturing tolerances) the dimensions and/or geometry of the second chamber 64. In certain embodiments, the dimensions and/or geometry of the third chamber 96 may be different from the dimensions and/or geometry of the second chamber 64.

Additionally, the first and second chambers 64 and 96 may include first and second openings 106 and 108, respectively. As illustrated, the first and second openings 106 and 108 (e.g., inlets, passages, holes, apertures, gaps, etc.) are formed in the first and second end portions 88 and 90, respectively. The first and second openings 106 and 108 may be configured to receive a first cable 110 and a second cable 112, respectively. The first cable 110 may be coupled to a first electrical component, and the second cable 112 may be coupled to a second electrical component. For example, in some embodiments, the first cable 110 may be coupled to the power source 40 or the power distribution unit 34. In some embodiments, the second cable 112 may be coupled to the power distribution unit 34 or an electrically-powered component 32.

To provide over-current protection for the first and second electrical components, the fuse filament 62 may be electrically coupled to the first and second cables 110 and 112. Specifically, the fuse filament 62 may be coupled (e.g., soldered, brazed, crimped, and the like) to first and second electrical connectors (e.g., electrical conductors, metal conductors, etc.) 114 and 116 that may couple to the first and second cables 110 and 112, respectively. In some embodiments, the first and second electrical connectors 114 and 116 may couple to the first and second cables 110 and 112, respectively, via first and second cable lugs 118 and 120, respectively.

As illustrated, the first and second electrical connectors 114 and 116 extend from the first chamber 60 through (e.g., past) the inner housing 78 to facilitate electrical connection between the first and second cables 110 and 112 and the fuse filament 62. Specifically, the first electrical connector 114 extends axially 50 from the first chamber 60 to the second chamber 64 through the pressure compensator 66. Additionally, the second electrical connector 116 extends axially 50 from the first chamber 60 to the third chamber 96 through the second face 82 of the inner housing 78. In certain embodiments, the first and second electrical conductors 114 and 116 may be coupled to (e.g., fixed to) the pressure compensator 66 and the second face 82, respectively. For example, in some embodiments, the first and second electrical conductors 114 and 116 may be fixed to the pressure compensator 66 and the second face 82, respectively, using adhesives, welds, brazed joints, soldered joints, vacuum bonds, or any combination thereof. In some embodiments, the first and second electrical conductors 114 and 116 may be formed from a material with a coefficient of thermal expansion that is approximately equal to (e.g., within ±10%, ±5%, ±3%, or ±1% of) the coefficient of thermal expansion of the pressure compensator 66 and/or the second face 82.

In some embodiments, the pressure-compensated fuse assembly 12 may be exposed to an external or surrounding fluid 122 (e.g., a liquid and/or a gas) that at least partially surrounds the outer housing 76 of the pressure-compensated fuse assembly 12. In certain embodiments, the pressure of the surrounding fluid 122 may be greater than approximately 1.1 atm, 1.2 atm, 1.3 atm, 1.4 atm, 1.5 atm, 2 atm, 5 atm, 10 atm, 50 atm, 100 atm, 250 atm, 500 atm, 750 atm, 1000 atm, or greater. In some embodiments, the pressure of the surrounding fluid 122 may be between approximately 100 atm and 1000 atm, 200 atm and 800 atm, or 300 atm and 700 atm.

In some embodiments, the first chamber 60 of the pressure-compensated fuse assembly 12 may contain a plurality of solid electrically insulating particles 124 and a first fluid 126 disposed between the solid particles 124. For example, in some embodiments, the solid insulating particles 124 may include sand particles, such as silica sand particles (e.g., quartz sand particles) and/or ceramic sand particles. In the event of an over-current, the fuse filament 62 may overheat and, in some scenarios, may form an arc. The solid particles 124 may be desirable, because they may cool the fuse filament 62 even when the fuse filament 62 is operated at near rated current, which may increase the lifetime of the fuse filament 62. Additionally, the solid particles 124 may disperse and extinguish potential arcs. Further, in some scenarios, the high temperature of an arc may melt the solid particles 124, and the melted solid particles 124 may fuse with the fuse filament 62 to form a non-conductive fulgurite body that may prevent re-striking of the arc. Additionally, the melting heat of the solid particles 124 may absorb the majority of the energy generated during arc extinguishing of the fuse filament 62 as latent heat (e.g., enthalpy of fusion).

In some embodiments, the first fluid 126 may include one or more gases. In certain embodiments, the first fluid 126 may include one or more inert gases, such as air, nitrogen, argon, and the like. The inert gases may be desirable, because the inert gases may not substantially alter the parameters of the fuse filament 62 in response to temperature changes. Additionally, in the event of an arc, the inert gas particles disposed between the solid particles 124 (e.g., the sand particle) may act as a cushion to limit the pressure shock from the arc. In certain embodiments, the first fluid 126 may include one or more liquids, such as one or more liquid dielectrics (e.g., oil, purified water, etc.). Oil may desirably cool the fuse filament 62; however, oil may change parameters of the fuse filament 62, such as the current-time characteristic, in response to both temperature and pressure changes of the oil. As discussed below, in some embodiments, between approximately 25% and 50% of the volume of the first chamber 60 may be filled with the first fluid 126 and the remainder (e.g., between approximately 50% and 75%) may be filled with the solid particles 124.

The first fluid 126 may have an initial pressure that is less than the pressure of the surrounding fluid 122. As used herein, the initial pressure of the first fluid 126 is the pressure of the first fluid 126 in the first chamber 60 at the completion of the manufacturing of the pressure-compensated fuse assembly 12 (i.e., the pressure of the first fluid 126 in the first chamber 60 before the pressure-compensated fuse assembly 12 is exposed to the surrounding fluid 122). In some embodiments, the initial pressure of the first fluid 126 may be approximately 1 atm (e.g., between approximately 0.9 atm and 1.1 atm or between approximately 0.95 atm and 1.05 atm). As noted above, it may be desirable to use the fuse filament 62 in an environment at a pressure of approximately 1 atm, because one or more operating characteristics of the fuse filament 62 may be altered if the fuse filament 62 is exposed to pressures greater and/or less than approximately 1 atm. However, it should be appreciated that the initial pressure may be any suitable pressure and may be selected based on the fuse filament 62. For example, a fuse filament 62 may be designed to operate at pressure of approximately 5 atm, and the initial pressure of the first fluid 126 may be approximately 5 atm. In some embodiments, the pressure of the surrounding fluid 122 may be at least 1.1, 1.2, 1.3, 1.4, 1.5, 2, 5, 10, 50, 100, 250, 500, 750, or 1000 times the initial pressure of the first fluid 126. In certain embodiments, the pressure of the surrounding fluid 122 may be between approximately 100 and 1000, 200 and 800, or 300 and 700 times the initial pressure of the first fluid 126.

Additionally, the second and third chambers 64 and 96 of the pressure-compensated fuse assembly 12 may contain second and third fluids 128 and 130, respectively. The fist, second, and third fluids 126, 128, and 130 may be the same or different. In certain embodiments, the second fluid 128 and/or the third fluid 130 may include one or more liquids, such as one or more liquid dielectrics (e.g., oil, purified water, etc.). The second and third fluids 128 and 130 may be provided to the second and third chambers 64 and 96, respectively, through any suitable openings in the outer housing 78. As illustrated, the second and third fluids 128 and 130 may be provided to the second and third chambers 64 and 96, respectively, via the first and second openings 106 and 108, respectively.

For example, in some embodiments, the first cable 110 may be disposed in a first jumper 132 (e.g., a hose, a pipe, a flow line, a tube, tubing, etc.) that is configured to hold (e.g., contain, house, etc.) the second fluid 128, and the first opening 106 may be configured to receive the first cable 110 and the second fluid 128. Additionally, in some embodiments, the second cable 112 may be disposed in a second jumper 134 that is configured to hold (e.g., contain, house, etc.) the third fluid 130, and the second opening 108 may be configured to receive the second cable 112 and the third fluid 130. In certain embodiments, the first and second jumpers 132 and 134 may each include a coupling 136 and 138 (e.g., a hose range, a mechanical and hydraulic coupling) that may be configured to couple to the first end portion 88 or the second end portion 90 via one or more mechanical attachments (e.g., bolts, rods, screws, threaded portions, etc.). The first and second jumpers 132 and 134 may protect or block the first and second cables 110 and 112, respectively, from wear or damage, which may otherwise occur due to mechanical forces and/or exposure to harsh environmental conditions, such as extreme (e.g., high and/or low) pressures, extreme temperatures, and/or corrosive and/or abrasive fluids.

The surrounding fluid 122 may apply pressure to the first and second jumpers 132 and 134, as indicated by arrows 140. The applied pressure 140 may pressurize the second fluid 128 in the first jumper 132 and the third fluid 130 in the second jumper 134. In some embodiments, the pressures of the second and third fluids 128 and 130 in the respective jumpers 132 and 134 and as a result, the pressures of the second and third fluids 128 and 130 in the respective chambers 64 and 96 may be approximately equal to (e.g., within ±10%, ±5%, ±3%, or ±1% of) the pressure of the surrounding fluid 122. In certain embodiments, the pressures of the second and third fluids 128 and 130 in the respective chambers 64 and 96 may be at least 85%, 90%, 95%, 97%, or 99% of the pressure of the surrounding fluid 122. In certain embodiments, the pressures of the second and third fluids 128 and 130 in the respective chambers 64 and 96 may be between approximately 85% and 100%, 90% and 100%, or 95% and 100% of the pressure of the surrounding fluid 122. As such, the second and third fluids 128 and 130 may reduce or minimize the pressure differential between the second and third chambers 64 and 96 (e.g., pressure compensating chambers, pressure balancing chambers, etc.) and the surrounding fluid 122, which may reduce or minimize the pressure differential between the pressure-compensated fuse assembly 12 and the surrounding fluid 122.

Further, the pressures of the second and third fluids 128 and 130 in the second and third chambers 64 and 96, respectively, may be greater than the initial pressure of the first fluid 126. In some embodiments, the pressures of the second and third fluids 128 and 130 may be at least 1.1, 1.2, 1.3, 1.4, 1.5, 2, 5, 10, 50, 100, 250, 500, 750, or 1000 times the initial pressure of the first fluid 126. In certain embodiments, the pressures of the second and third fluids 128 and 130 may be between approximately 100 and 1000, 200 and 800, or 300 and 700 times the initial pressure of the first fluid 126. The pressure compensator 66 may be configured to compensate for the pressure differential between the first chamber 60 and the second and third chambers 64 and 96, while separating or isolating the first fluid 126 in the first chamber 60 from the second fluid 128 in the second chamber 64. In particular, as discussed in more detail below with respect to FIGS. 4A and 4B, due to the pressure of the second fluid 128 and the pressure of the surrounding fluid 122, the pressure compensator 66 (e.g., a piston) may be configured to apply a force on the plurality of solid particles 124 and the first fluid 126 in the first chamber 60. This force may be counteracted by the mechanical force from the plurality of solid particles 124 (e.g., densely packed or compacted solid particles). That is, the plurality of solid particles 124 may reduce, minimize, or block axial movement of the pressure compensator 66 relative to the sleeve 84 such that the pressure of the first fluid 126 in the first chamber 60 is not substantially altered (e.g., is within approximately ±10%, ±5%, ±3%, or ±1% of the initial pressure of the first fluid 126) when the pressure-compensated fuse assembly 12 is exposed to the surrounding fluid 122.

Figure 3:
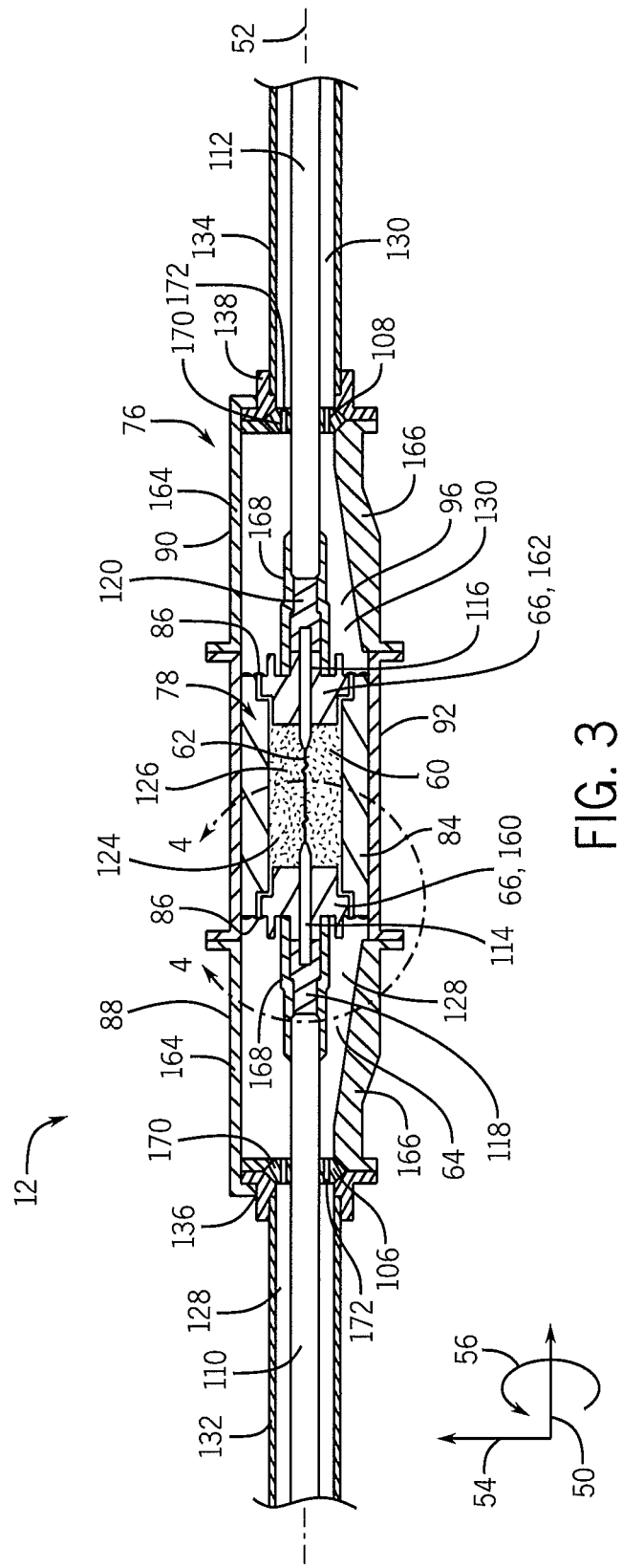
FIG. 3 is a cross-sectional view of an embodiment of a pressure-compensated fuse assembly including a particle-filled chamber and two pressure compensators.

FIG. 3 is an embodiment of the pressure-compensated fuse assembly 12 including two pressure compensators 66. Specifically, the pressure-compensated fuse assembly 12 includes a first pressure compensator 160 disposed between the first chamber 60, which houses the fuse filament 62, the plurality of solid particles 124, and the first fluid 126, and the second chamber 64, which houses the second fluid 128. Additionally, the pressure-compensated fuse assembly 12 includes a second pressure compensator 162 disposed between the first chamber 60 and the third chamber 96, which houses the third fluid 130. As illustrated, the first and second pressure compensators 160 and 162 are each coupled to the sleeve 84 of the inner housing 78 via seals 86 (e.g., flexible metal seals, flexible metal membranes, etc).

Further, the pressure-compensated fuse assembly 12 includes the outer housing 76 that is disposed about the inner housing 78, the second chamber 64, and the third chamber 96. In the illustrated embodiment, the first and second end portions 88 and 90 of the outer housing 76 include end bell housings. In particular, the first and second end portions 88 and 90 may each include a sliding end bell 164 and a standard end bell 166. The first and second end portions 88 and 90 may be configured to couple to the first and second jumpers 132 and 134, respectively, via the connectors 136 and 138, respectively. As noted above, the first jumper 132 (e.g., flexible hose) may contain the first cable 110 and the second fluid 128. Additionally, the second jumper 134 may contain the second cable 112 and the third fluid 130. The first and second jumpers 132 and 134 may protect or block the first and second cables 110 and 112, respectively, from wear or damage, which may otherwise occur due to mechanical forces and/or exposure to harsh environmental conditions, such as extreme (e.g., high and/or low) pressures, extreme temperatures, and/or corrosive and/or abrasive fluids.

As noted above, the first and second cables 110 and 112 may couple to the first and second electrical connectors 114 and 116, respectively, via first and second cable lugs 118 and 120, respectively. In some embodiments, the first and second cable lugs 118 and 120 may each be disposed in boot seals 168 (e.g., seal sleeves). The boot seals 168 may protect the first and second cable lugs 118 and 120 from harsh environmental conditions, such as extreme (e.g., high and/or low) pressures, extreme temperatures, and/or corrosive and/or abrasive fluids.

Additionally, in some embodiments, the pressure-compensated fuse assembly 12 may include packers 170 (e.g., cable holders, cable retainers, cable movement restrainers, cable stabilizers, etc.) disposed about (e.g., circumferentially 56 about) the first and second cables 110 and 112. The packers 170 may be configured to mechanically secure or restrain the cables 110 and 112 to reduce or block movement of the first and second cables 110 and 112. In particular, the packers 170 may reduce or block axial 50, radial 54, and/or circumferential 56 movements of the first and second cables 110 and 112. In this manner, the packers 170 may block the cables 110 and 112 from applying force or torque on the first and second electrical connectors 114 and 116, respectively. As illustrated, the packers 170 may be disposed in the first and second openings 106 and 108 (e.g., between the outer housing 76 and the first and second connectors 136 and 138). Additionally, the packers 170 may include one or more fluid passages 172 to enable fluid (e.g., the second fluid 128 and/or the third fluid 130) to flow through the packers 170 from the jumpers 132 and 134 to the respective chambers 64 and 96.

As noted above, the surrounding fluid 122 may apply pressure, as indicated by the arrows 140, to the second fluid 128 and the third fluid 130 in the first and second jumpers 132 and 134, respectively. As a result, the pressures of the second and third fluids 128 and 130 in the second and third chambers 64 and 96, respectively, may be approximately equal to (e.g., within ±10%, ±5%, ±3%, or ±1% of) the pressure of the surrounding fluid 122. Further, in some embodiments, the pressures of the surrounding fluid 122, the second fluid 128, and/or the third fluid 130 may be between approximately 100 and 1000, 200 and 800, or 300 and 700 times the initial pressure of the first fluid 126. As discussed below, the first pressure compensator 160 (e.g., a first piston) may be configured to axially 50 translate toward the fuse filament 62 in response to fluid pressure of the second fluid 128 in the second chamber 64 while separating the first fluid 126 in the first chamber 60 from the second fluid 128 in the second chamber 64. Additionally, the second pressure 162 (e.g., a second piston) may be configured to axially translate 50 toward the fuse filament 62 in response to fluid pressure of the third fluid 130 in the third chamber 96 while separating the first fluid 126 in the first chamber 60 from the third fluid 130 in the third chamber 96. As such, the first and second pressure compensators 160 and 162 may transfer the force resulting from pressure to the plurality of solid particles 124 (e.g., packed solid particles) in the first chamber 60 to reduce or minimize the pressure change in the first chamber 60 (e.g., the pressure change of the first fluid 126) as the pressure increases in the second and third chambers 64 and 96.

Figure 4A:
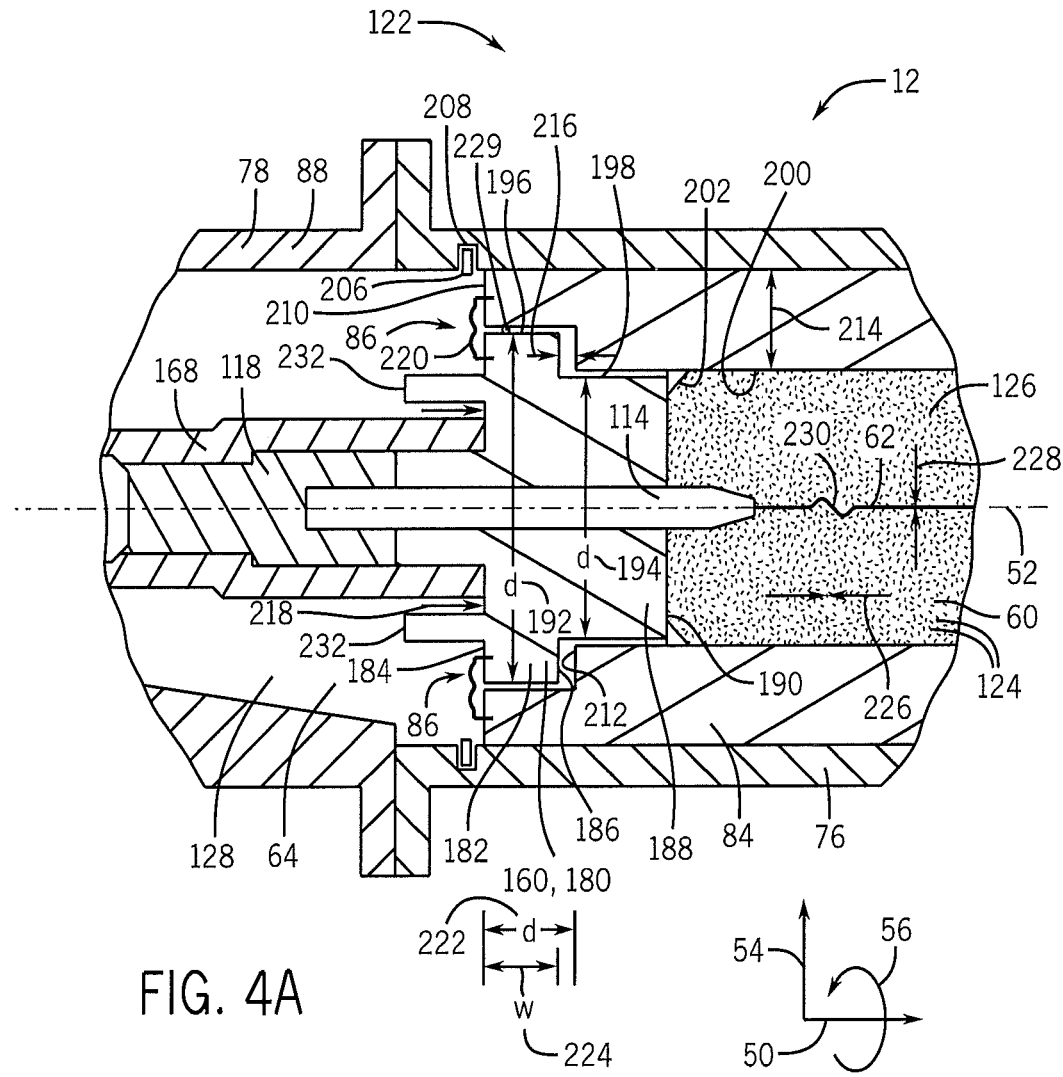
FIG. 4A is a partial cross-sectional view of an embodiment of a pressure-compensated fuse assembly taken within line 4-4 of FIG. 3, illustrating a pressure compensator in a first position.
Figure 4B:
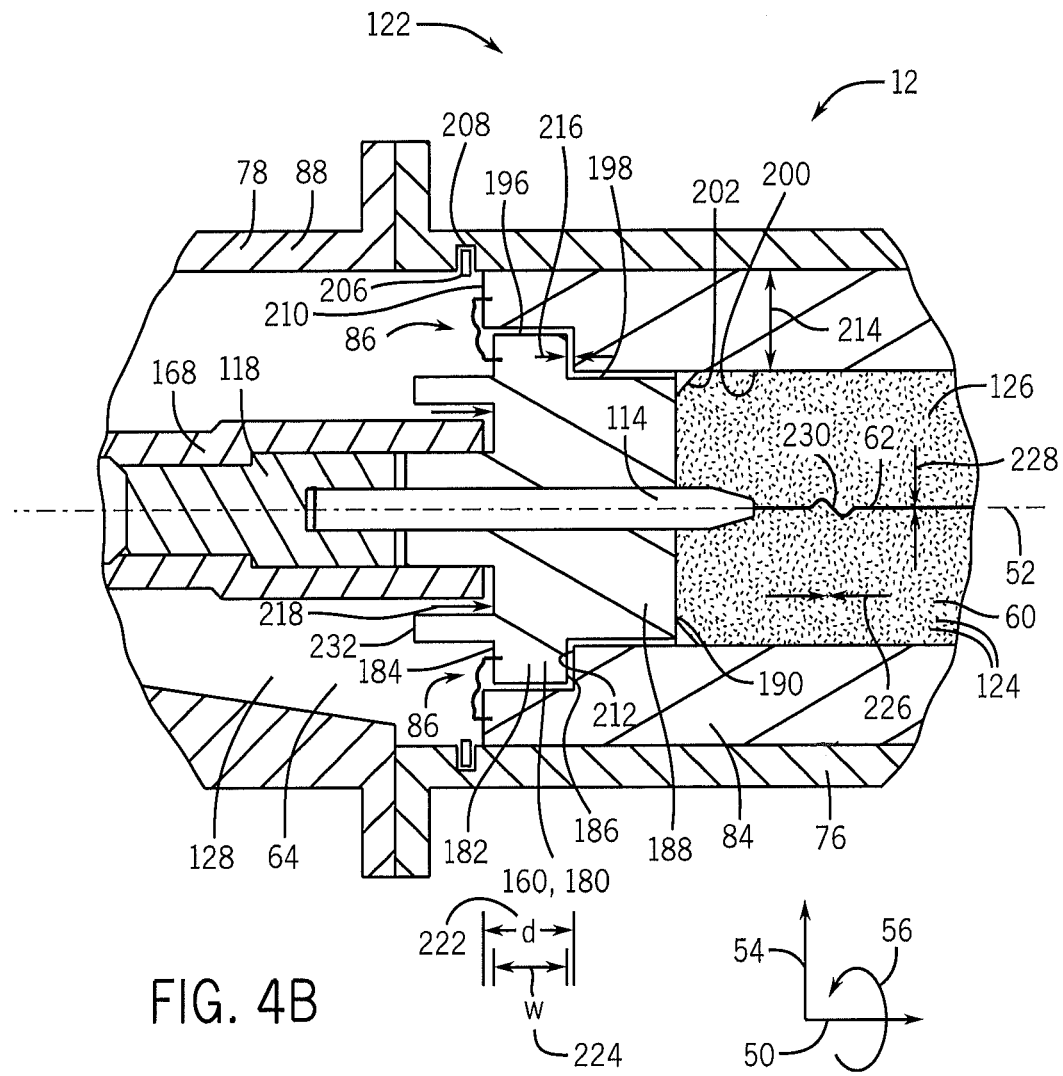
FIG. 4B is a partial cross-sectional view of an embodiment of a pressure-compensated fuse assembly taken within line 4-4 of FIG. 3, illustrating the pressure compensator in a second position.

FIGS. 4A and 4B are partial cross-sectional views of the pressure-compensated fuse assembly 12 taken within line 4-4 of FIG. 3. In particular, FIG. 4A shows the first pressure compensator 160 in a first position, and FIG. 4B shows the first pressure compensator 160 in a second position. While the following discussion relates to the first pressure compensator 160, it should be appreciated that, in some embodiments, the second pressure compensator 162 may include substantially similar features to perform substantially the same function as the first pressure compensator 160.

In the illustrated embodiment, the first pressure compensator 160 is a piston 180 (e.g., a generally cylindrical piston).

The piston 180 includes a first portion 182 (e.g., a cylindrical base, a piston seat, a large diameter portion, etc.) including a first face 184 (e.g., axial face) that faces the second chamber 64 and a second face 186 (e.g., axial face) that faces the first chamber 60 and the fuse filament 62. Additionally, the piston 180 includes a second portion 188 (e.g., a cylindrical stem, a stepped portion, a reduced diameter portion, etc.) extending axially 50 from the second face 186 of the first portion 182 toward the fuse filament 62. The second portion 188 includes a third face 190 (e.g., axial face) that faces the first chamber 60 and the fuse filament 62. Further, a diameter 192 of the first portion 182 is larger than a diameter 194 of the second portion 188.

As illustrated, the piston 180 is disposed within (e.g., circumferentially 56 surrounded by) the sleeve 84 (e.g., an annular sleeve) of the inner housing 78. In particular, a first annular surface 196 of the first portion 182 and a second annular surface 198 of the second portion 188 may be configured to engage with and/or seal against an inner annular surface 200 of the sleeve 84. For example, in some embodiments, a seal 202 (e.g., a particle wiper, a wiper seal, etc.) may be disposed between the second portion 188 and the inner annular surface 200 of the sleeve 84. The seal 202 may be configured to separate or isolate the first fluid 126 and the solid particles 124 in the first chamber 60 from entering into the annulus between sleeve 84 and piston 182. As illustrated, the sleeve 84 may be maintained or fixed in place relative to the outer housing 76 via one or more locking rings 206 disposed in one or more grooves 208 formed in the sleeve 92 of the outer housing 76. In particular, the one or more locking rings 206 are disposed adjacent to an axial end face 210 of the sleeve 84.

Additionally, the sleeve 84 may be shaped to generally correspond to the shape of the first portion 182 and the second portion 188 of the piston 180. For example, the sleeve 84 may include a stepped surface 212 (e.g., an axial stepped surface), and the second face 186 of the first portion 182 may be disposed adjacent to the stepped surface 212. The stepped surface 212 may reduce a wall thickness 214 of the sleeve 84 by an amount that is approximately equal to the difference between the diameter 192 of the first portion 182 and the diameter 194 of the second portion 188.

As illustrated in FIG. 4A, the second face 186 of the first portion 182 of the piston 180 is spaced apart from the stepped surface 212 of the sleeve 84 by a distance 216 (e.g., a gap) when the piston 180 is in the first position (e.g., an initial position). In operation, the pressure of the second fluid 128 in the second chamber 64 applies a force (e.g., an axial 50 force), as indicated by arrows 218, on the first face 184 of the first portion 182 of the piston 180, which urges the piston 180 toward the fuse filament 62. As illustrated in FIG. 4B, the piston 180 may axially 50 translate toward the fuse filament 62 in response to the applied force 218, thereby reducing or removing the distance 216 between the second face 186 and the stepped surface 206. The piston 180 may also translate in response to temperature-dependent changes in volume of the first chamber 60 and second chamber 64.

As such, the piston 180 may transfer the force 218 to the plurality of solid particles 124 and the first fluid 126 in the first chamber 60. The plurality of solid particles 124 act as solid, incompressible matter and are configured to withstand the force 218 applied by the piston 180 to mechanically pressure compensate the first chamber 60. As will be appreciated, the first fluid 126 (e.g., inert gas, air, nitrogen, argon, etc.) may be compressible and may increase in pressure relative to the volume reduction of the first chamber 60. However, the plurality of solid particles 124 may counteract the force 218 to reduce, minimize, or block axial 50 movement of the pressure compensator 66 relative to the sleeve 84 such that the volume of the first chamber 60 and the pressure of the first fluid 126 in the first chamber 60 are not substantially altered (e.g., is within approximately ±10%, ±5%, ±3%, or ±1% of the initial pressure of the first fluid 126 and the initial volume of the first chamber 60) when the pressure-compensated fuse assembly 12 is exposed to the surrounding fluid 122.

Additionally, the parameters of the solid particles 124 and the first fluid 126 in the first chamber 60 may affect the pressure change of the first fluid 126 due to translation of the piston 180. Further, in some embodiments, the solid particles 124 may be compacted in the first chamber 60 with an applied force that is greater than the force 218 applied to the piston 180 and the solid particles 124. In some embodiments, to maintain the pressure of the first fluid 126 within approximately ±10%, ±5% ±3%, or ±1% of the initial pressure of the first fluid 126, between approximately 25% and 50% of the volume of the first chamber 60 may be filled with the first fluid 126 (e.g., an inert gas, air, nitrogen, argon, etc.), and the remainder (e.g., between approximately 50% and 75% of the volume of the first chamber 60) may be filled with the solid particles 124 (e.g., essentially spherical particles of substantially even size). That is, in some embodiments, after the solid particles 124 are compacted, approximately 25% and 50% of the volume of the first chamber 60 may be filled with the first fluid 126 and the remainder (e.g., between approximately 50% and 75% of the volume of the first chamber 60) may be filled with the solid particles 124. In certain embodiments, the particle fill-factor (e.g., the volume of the first chamber 60 filled with solid particles 124, the sand fill-factor) may be dependent on the grain size (e.g., diameter), shape (e.g., spherical, cubic, irregular, etc.), type (e.g., quartz sand particles, ceramic sand particles, etc.), and mix (e.g., distribution of grain size, shape, and/or type). For example, essentially spherical solid particles 124 of substantially even size may be more uniformly packed, which may result in a higher particle fill-factor (e.g., a higher percentage of solid particles 124). In some embodiments, the diameter 226, shape, and/or type of the solid particles 124 in the first chamber 60 may be the same or different. In certain embodiments, the diameter 226 of each solid particle 124 and/or the average diameter of the solid particles 124 may be less than approximately 50% of a thickness 228 of the fuse filament 62.

In some embodiments, a distance 222 between the axial end face 210 of the sleeve 84 and the stepped surface 212 of the sleeve 84 and/or a width 224 of the first portion 182 of the piston 180 may be selected to block or prevent translation of the piston 180 above a predetermined distance. In particular, the stepped surface 212 may abut the second face 186 of the piston 180 to block or prevent translation of the second face 186 past the stepped surface 212. Thus, the maximum distance that the piston 180 can travel may be based on the distance 222 and the width 224 of the first portion 182.

In certain embodiments, the parameters of the solid particles 124, the distance 222, and/or the width 224 may be selected to enable translation of the piston 180 up to a predetermined distance to achieve a particular reduction in the volume of the first chamber 60. In some embodiments, the volume reduction of the first chamber 60 may be less than approximately 20%, approximately 15%, approximately 10%, approximately 5%, approximately 3%, approximately 1%, or approximately 0.5%. In certain embodiments, the volume reduction of the first chamber 60 may be between approximately 1% and 10%, 1% and 5%, or 1% and 3%. These volume reductions may not substantially increase pressure of the first fluid 126 relative to the initial pressure of the first fluid 126. For example, the pressure of the first fluid 126 after translation of the piston 180 may within approximately ±10%, ±5%, ±3%, or ±1% of the initial pressure of the first fluid 126.

As illustrated, the pressure-compensated fuse assembly 12 may also include the one or more seals 86 (e.g., flexible metal seals, flexible metal membranes, etc.), which may be configured to couple the piston 180 to the sleeve 84. Specifically, the one or more seals 86 may be welded or bonded to the axial end face 210 of the sleeve 84 and welded or bonded to the first face 184 of the first portion 182 of the piston 180. The one or more seals 86 may each be configured to form a dynamic seal (e.g., maintain a seal during translation of the piston 180) between the piston 180 and the sleeve 84. The one or more seals 86 may isolate or separate the first fluid 126 and the plurality of solid particles 124 in the first chamber 60 from the second fluid 128 in the second chamber 64. That is, the one or more seals 86 may block the second fluid 128 from entering the first chamber 60. For example, the one or more seals 86 may seal off a gap 229 (e.g., an annulus) between the piston 180 and the sleeve 84. In certain embodiments, the one or more seals 86 may be annular. In some embodiments, the pressure-compensated fuse assembly 12 may include two or more seals 86 that are spaced circumferentially 56 about the axial end face 210 of the sleeve 84 and the first face 184 of the piston 180. Additionally, as illustrated in FIG. 4A, the seal 86 may include one or more curved or bent portions 220 that are spaced apart from the piston 180 and the sleeve 84. The seal 86 may be formed from a flexible (e.g., ductile, pliable, etc.) material, such as a metallic material. As illustrated in FIG. 4B, the curved or bent portions 220 may be configured to flatten or straighten (e.g., partially flatten or straighten or elastically deform) as the piston 180 translates.

As illustrated, in some embodiments, the fuse filament 62 may include one or more curved or bent portions 230 (e.g., s-shaped portions). For example, in some scenarios, the fuse filament 62 may be pushed inside of the first electrical conductor 114 as the piston 180 is displaced. The curved or bent portions 230 may block or prevent the fuse filament 62 from entering and/or becoming stuck within the first electrical conductor 114. Additionally, in some embodiments, the piston 180 may include one or more circumferential extensions 232. Specifically, the one or more extensions 232 may extend from the first face 182 of the piston 180 in the axial direction 50 toward the first cable lug 118. The extensions 232 may be configured to increase a creepage distance between the first cable lug 118 and the seal 86.

Figure 5:
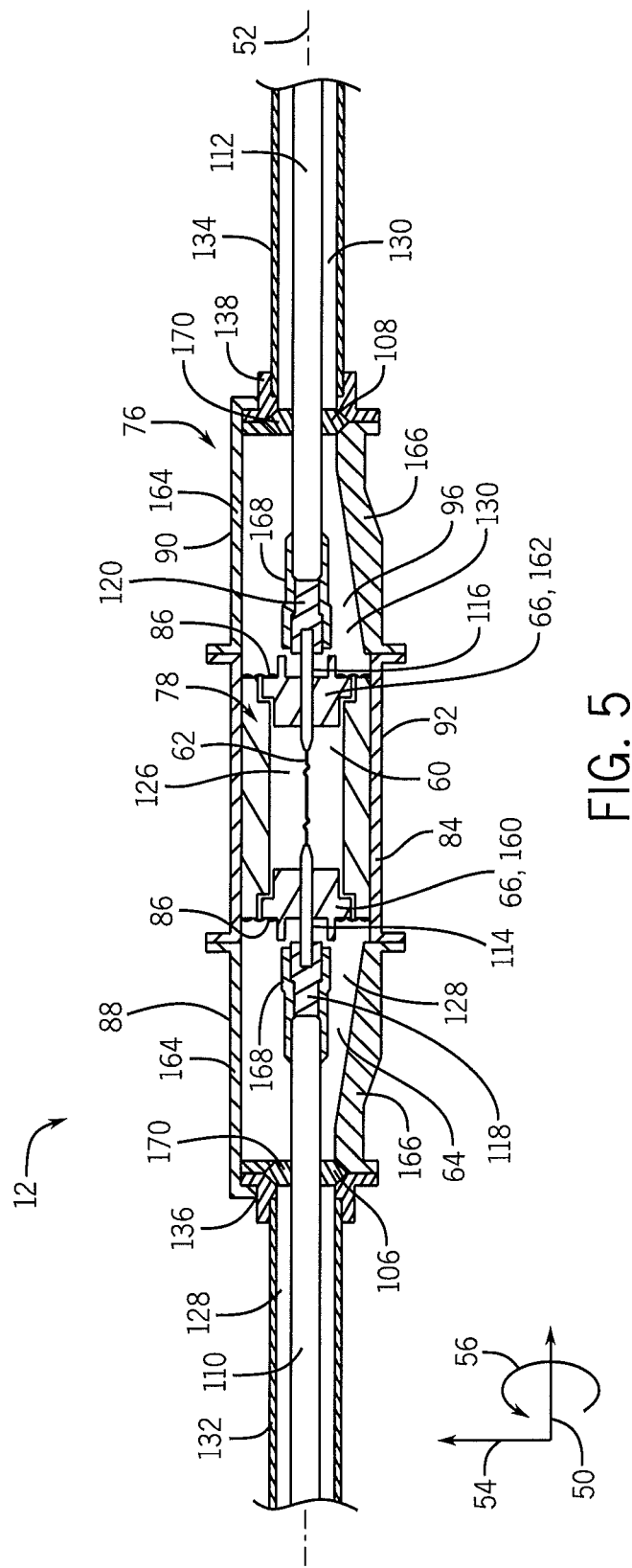
FIG. 5 is a cross-sectional view of an embodiment of a pressure-compensated fuse assembly including a liquid-filled chamber and two pressure compensators.

FIG. 5 is an embodiment of the pressure-compensated fuse assembly 12 including the first chamber 60, which houses the first fluid 126, and two pressure compensators 66. In certain embodiments, the first fluid 126 may include a dielectric fluid, such as oil. As illustrated, the first chamber 60 does not include the solid particles 124. Thus, translation of the pressure compensators 66 may transfer pressure to the first fluid 126 in the first chamber 60, thereby increasing the pressure of the first fluid 126 relative to the initial pressure of the first fluid 126. For example, in some embodiments, translation of the pressure compensators 66 may increase the pressure of the first fluid 126 by more than 10%, 15%, 20%, or more relative to the initial pressure of the first fluid 126. In certain embodiments, the pressure of the first fluid 126 in the first chamber 60 may be approximately equal to (e.g., within approximately ±10%, ±5%, ±3%, or ±1% of) the pressure of the second fluid 128, the pressure of the third fluid 130, and/or the pressure of the surrounding fluid 122.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A pressure-compensated fuse assembly, comprising:
a first chamber housing a first fluid and a plurality of solid particles;
a second chamber housing a second fluid; and
a pressure compensator disposed between the first chamber and the second chamber, wherein the pressure compensator is configured to undergo a movement to transfer pressure from the second fluid in the second chamber to the plurality of solid particles in the first chamber, and the plurality of solid particles block the movement of the pressure compensator.

2. The fuse assembly of claim 1, wherein the first fluid comprises a gas, a fuse element is disposed in the first chamber, and the plurality of solid particles are electrically insulating.

3. The fuse assembly of claim 1, wherein the plurality of solid particles fill at least approximately 50% of a volume of the first chamber.

4. The fuse assembly of claim 1, wherein the pressure compensator is configured to translate toward the first chamber in a direction along an axis of a fuse element, a first conductor coupled to the fuse element, or a second conductor coupled to the fuse element.

5. The fuse assembly of claim 1, wherein the plurality of solid particles are densely packed or compacted in the first chamber to block the movement of the pressure compensator.

6. The fuse assembly of claim 1, comprising:
a third chamber housing a third fluid; and
a second pressure compensator disposed between the first chamber and the third chamber.

7. The fuse assembly of claim 1, wherein the plurality of solid particles block the movement of the pressure compensator to resist a change in pressure of the first fluid.

8. The fuse assembly of claim 7, wherein the plurality of solid particles block the movement of the pressure compensator such that the pressure of the first fluid changes less than 10 percent relative to an initial pressure.

9. The fuse assembly of claim 8, wherein the initial pressure is approximately 1 atm.

10. The fuse assembly of claim 7, wherein the first fluid comprises an inert gas.

11. A fuse system, comprising:
a first housing comprising a first chamber having a fuse element, a first fluid, and a plurality of solid particles;
a pressure compensator coupled to the first housing, wherein the pressure compensator is configured to undergo a movement to transfer pressure from a second fluid outside of the first chamber to the plurality of solid particles in the first chamber, and the plurality of solid particles block the movement of the pressure compensator.

12. The fuse system of claim 11, wherein the first housing comprises an electrically non-conducting sleeve disposed around the first chamber, wherein the pressure compensator is configured to undergo the movement along an axis of the electrically non-conducting sleeve in response to the pressure of the second fluid outside of the first chamber.

13. The fuse system of claim 11, wherein the pressure compensator comprises a piston and a flexible metal membrane that seals between the piston and the first housing.

14. The fuse system of claim 11, wherein the pressure compensator is coupled to the fuse element, a first conductor coupled to the fuse element, or a second conductor coupled to the fuse element.

15. The fuse system of claim 11, wherein the plurality of solid particles block the movement of the pressure compensator to resist a change in pressure of the first fluid.

16. The fuse system of claim 15, wherein the first fluid comprises a gas.

17. A subsea mineral extraction system, comprising:
a pressure-compensated fuse assembly configured to be disposed in a subsea location, wherein the pressure-compensated fuse assembly comprises:
an outer housing;
an inner housing disposed within the outer housing, wherein the inner housing comprises:
a first chamber having a first fluid;
a sleeve disposed circumferentially around the first chamber; and
a piston disposed within the sleeve, wherein the piston is configured to translate relative to the sleeve; and
a second chamber having a second fluid, wherein the second chamber is disposed in the outer housing, and wherein the piston is disposed between the first chamber and the second chamber.

18. The system of claim 17, wherein the first fluid and the second fluid each comprise a dielectric fluid.

19. The system of claim 18, wherein the piston is configured to reduce a pressure differential between the first chamber and the second chamber.

20. The system of claim 17, wherein the piston is configured to separate the first fluid in the first chamber from the second fluid in the second chamber.

21. The system of claim 17, wherein the first fluid comprises a gas, and wherein the first chamber is filled with a plurality of solid particles.

22. The system of claim 21, wherein the plurality of solid particles are configured to counteract a force applied to the pressure-compensated fuse assembly resulting from a pressure surrounding the pressure-compensated fuse assembly.

23. The system of claim 21, wherein the plurality of solid particles fills between approximately 50% and approximately 75% of a volume of the first chamber.

24. The system of claim 17, comprising a flexible metal membrane that seals between the piston and the sleeve, wherein the flexible metal membrane is configured to block the second fluid from entering the first chamber.

25. The system of claim 17, wherein a pressure of the second fluid is approximately equal to a pressure of a fluid surrounding the pressure-compensated fuse assembly, and wherein the piston is configured to transfer a force resulting from the pressure of the second fluid to the first fluid in the first chamber.

26. The system of claim 25, wherein the first chamber comprises a plurality of solid particles, and wherein the piston is configured to transfer pressure from the second fluid in the second chamber to the plurality of solid particles.

27. A system, comprising:
a pressure-compensated fuse assembly, comprising:
a first chamber containing a gas and a plurality of solid particles;
a sleeve disposed around the first chamber;
a second chamber containing a dielectric fluid;
a piston disposed within the sleeve and between the first chamber and the second chamber, wherein the piston is configured to translate relative to the sleeve; and
a flexible metal seal coupling the piston to the sleeve, wherein the flexible metal seal that seals off an annulus between the piston and the sleeve to separate the gas and the plurality of solid particles in the first chamber from the dielectric fluid in the second chamber.

28. The system of claim 27, wherein a pressure of the dielectric fluid in the second chamber is approximately equal to a pressure surrounding the pressure-compensated fuse assembly, wherein the piston is configured to translate toward the plurality of solid particles to transfer a force resulting from the pressure of the dielectric fluid in the second chamber to the gas and the plurality of solid particles in the first chamber, wherein the plurality of solid particles are configured to counteract the force transferred by the piston.

* * * * *